US009520751B2

(12) United States Patent
Raminosoa et al.

(10) Patent No.: US 9,520,751 B2
(45) Date of Patent: Dec. 13, 2016

(54) SYSTEM AND METHOD FOR SMOOTHING A SALIENT ROTOR IN ELECTRICAL MACHINES (71) Applicant: General Electric Company, Schenectady, NY (US)

(72) Inventors: Tsarafidy Raminosoa, Niskayuna, NY (US); James Pellegrino Alexander, Ballston Lake, NY (US); Ayman Mohamed Fawzi El-Refaie, Niskayuna, NY (US); David A. Torrey, Ballston Spa, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 367 days.

(21) Appl. No.: 13/949,406

(22) Filed: Jul. 24, 2013

(65) Prior Publication Data
US 2015/0028718 A1 Jan. 29, 2015

(51) Int. Cl.
*H02K 1/22* (2006.01)
*H02K 1/28* (2006.01)
(Continued)

(52) U.S. Cl.
CPC ............... *H02K 1/22* (2013.01); *H02K 1/246* (2013.01); *H02K 15/02* (2013.01); *H02K 2205/12* (2013.01); *Y10T 29/49012* (2015.01)

(58) Field of Classification Search
CPC ............ H02K 1/22; H02K 1/24; H02K 1/246; H02K 1/26; H02K 1/265; H02K 1/28; H02K 1/32; H02K 1/325; H02K 3/32; H02K 3/34; H02K 3/345
(Continued)

(56) References Cited

U.S. PATENT DOCUMENTS 4,058,746 A  11/1977 Mole et al.
4,506,181 A * 3/1985 Jones .................... H02K 1/276
                                                  310/156.78
(Continued)

FOREIGN PATENT DOCUMENTS

GB  1544973 A  4/1979
WO  2012004609 A2  1/2012

OTHER PUBLICATIONS

Richardson et al, "3-Dimensional Finite Element Analysis of a Bridged Rotor Switched Reluctance Motor," 1997 Eighth International Conference on Electrical Machines and Drives, Sep. 1-3, 1997, Conference Publication No. 444, pp. 56-58.
(Continued)

*Primary Examiner* — Michael Andrews
(74) *Attorney, Agent, or Firm* — Meagher Emanuel Laks Goldberg & Liao, LLP (57) ABSTRACT An electrical machine exhibiting reduced friction and windage losses is disclosed. The electrical machine includes a stator and a rotor assembly configured to rotate relative to the stator, wherein the rotor assembly comprises a rotor core including a plurality of salient rotor poles that are spaced apart from one another around an inner hub such that an interpolar gap is formed between each adjacent pair of salient rotor poles, with an opening being defined by the rotor core in each interpolar gap. Electrically non-conductive and non-magnetic inserts are positioned in the gaps formed between the salient rotor poles, with each of the inserts including a mating feature formed an axially inner edge thereof that is configured to mate with a respective opening being defined by the rotor core, so as to secure the insert to the rotor core against centrifugal force experienced during rotation of the rotor assembly.

20 Claims, 7 Drawing Sheets

(51) Int. Cl.
*H02K 15/02* (2006.01)
*H02K 1/24* (2006.01)

(58) Field of Classification Search
USPC .... 310/216.105, 216.091, 216.078, 214, 215
See application file for complete search history.

(56) References Cited

U.S. PATENT DOCUMENTS

| | | | |
|---|---|---|---|
| 4,916,346 A | | 4/1990 | Kliman |
| 4,918,831 A | | 4/1990 | Kliman |
| 5,001,378 A | | 3/1991 | Miller et al. |
| 5,053,666 A | | 10/1991 | Kliman et al. |
| 5,726,516 A | | 3/1998 | Randall |
| 5,932,948 A | * | 8/1999 | Morrison ............... H02K 3/527 310/214 |
| 5,952,755 A | | 9/1999 | Lubas |
| 6,552,462 B2 | | 4/2003 | Sakai et al. |
| 2003/0184180 A1 | * | 10/2003 | Doherty ................. H02K 3/527 310/214 |
| 2012/0025639 A1 | * | 2/2012 | Zywot .................... H02K 3/527 310/214 |
| 2012/0306297 A1 | | 12/2012 | Kim et al. |

OTHER PUBLICATIONS

European Search Report and Opinion issued in connection with corresponding EP Application No. 14177512.2 on May 31, 2016.

* cited by examiner

SYSTEM AND METHOD FOR SMOOTHING A SALIENT ROTOR IN ELECTRICAL MACHINES

GOVERNMENT LICENSE RIGHTS

This invention was made with Government support under contract number DE-EE0005573 awarded by the United States Department of Energy. The Government has certain rights in the invention.

BACKGROUND OF THE INVENTION

The invention relates generally to electrical machines and, more particularly, to a system and method for smoothing a salient rotor of an electrical machine in order to reduce friction and windage losses in the machine, while providing for a mechanically robust rotor assembly that can withstand centrifugal forces at high speeds.

The usage of electrical machines in various industries has continued to become more prevalent in numerous industrial, commercial, and transportation industries over time. Several types of such electrical machines, such as reluctance motors and stator permanent magnet motors for example, require the use of salient poles or protruding teeth on the rotor. These types of rotors are generally passive and robust and thus suitable for high-speed applications. It is recognized, however, that the salient structure of such rotors contributes to the creation of excessive windage losses due to the tendency of the protrusions to catch air as the rotor rotates.

One manner of addressing the issue of windage losses that accompany the use of salient rotors is to "smooth" the outer surface of the rotor by filling the interpolar spaces between the rotor teeth. One prior art mechanism for filling in the interpolar spaces is magnetic bridges that are positioned between the rotor poles so as to connect adjacent rotor pole tips, thereby smoothing the rotor. Such magnetic bridges, however, negatively affect the magnetic saliency and thus serve to reduce the performance of the electrical machine. Another prior art mechanism for filling in the interpolar spaces is segments of a non-magnetic material (e.g., stainless steel) positioned between the rotor poles, such as described in U.S. Pat. No. 4,916,346, that provide smoothing to the rotor and do not affect the magnetic saliency. However, in the prior art, such non-magnetic segments have been formed as solid, plain metallic inserts that greatly increase the overall mass of the electrical machine. Additionally, such non-magnetic segments have been either welded to the rotor poles or secured thereto solely via a notch formation, both of which may not be ideal for retaining the segments between the rotor poles and/or provide a desired robustness for the rotor assembly. Further, metallic inserts and their associated welds are subject to eddy current losses that reduce the efficiency of the machine.

Therefore, it would be desirable to provide inserts for smoothing a salient rotor that address the issue of windage losses without affecting the magnetic performance. It would further be desirable for such inserts to be assembled with the salient rotor in a mechanically robust way that can withstand centrifugal forces at high speeds, while minimizing the mass that is added to the rotor.

BRIEF DESCRIPTION OF THE INVENTION

In accordance with one aspect of the invention, an electrical machine includes a stator and a rotor assembly disposed within the stator and configured to rotate relative to the stator, wherein the rotor assembly comprises a rotor core comprising a plurality of salient rotor poles that are spaced apart from one another around an inner hub such that an interpolar gap is formed between each adjacent pair of salient rotor poles, with an opening being defined by the rotor core in each interpolar gap, and a plurality of inserts positioned in the gaps formed between the plurality of salient rotor poles, the plurality of inserts being formed of electrically non-conductive and non-magnetic material. Each of the plurality of inserts comprises a mating feature formed an axially inner edge thereof that is configured to mate with a respective opening being defined by the rotor core, so as to secure the insert to the rotor core against centrifugal force experienced during rotation of the rotor assembly.

In accordance with another aspect of the invention, a method for manufacturing an electrical machine includes providing a stator and providing a rotor assembly that is positionable within the stator and is mountable for rotation about a central axis, wherein providing the rotor assembly comprises providing a salient rotor core comprising a plurality of salient rotor poles that are spaced apart from one another around an inner hub such that an interpolar gap is formed between each adjacent pair of salient rotor poles, with a dovetail-shaped opening being defined by the rotor core in each interpolar gap. Providing the rotor assembly further comprises providing a plurality of inserts formed of electrically non-conductive and non-magnetic material and securing the plurality of inserts in the interpolar gaps formed between the plurality of salient rotor poles, wherein, in securing each of the plurality of inserts in an interpolar gap formed between an adjacent pair of salient rotor poles, a mating feature of the insert is mated with a respective opening being defined by the rotor core, so as to secure the insert to the rotor core against centrifugal force experienced during rotation of the rotor assembly.

In accordance with yet another aspect of the invention, a rotor assembly for an electrical machine includes a salient rotor comprising a plurality of salient rotor poles that are spaced apart from one another around an inner hub such that an interpolar gap is formed between each adjacent pair of salient rotor poles and a plurality of inserts positioned in the interpolar gaps formed between the plurality of salient rotor poles and being constructed such that the plurality of inserts in combination with the plurality of salient rotor poles forms a smooth outer surface on the rotor assembly. The plurality of inserts comprise one of T-shaped inserts formed of an electrically non-conductive and non-magnetic material, hollow inserts having an outer shell formed of an electrically non-conductive and non-magnetic material, or dovetail-shaped inserts formed of an electrically non-conductive and non-magnetic material. Each of the plurality of inserts is configured to mate with the salient rotor so as to secure the insert to the salient rotor against centrifugal force experienced during rotation of the rotor assembly.

Various other features and advantages will be made apparent from the following detailed description and the drawings.

BRIEF DESCRIPTION OF THE DRAWINGS

The drawings illustrate preferred embodiments presently contemplated for carrying out the invention.

In the drawings.

DETAILED DESCRIPTION OF THE PREFERRED EMBODIMENT

Embodiments of the invention are to electrical machines incorporating a salient rotor, with inserts being provided for the salient rotor for smoothing the rotor so as to address issues of friction and windage losses without affecting the magnetic performance. While embodiments of the invention are discussed with respect to an electrical machine in which the rotor and stator interact through radial magnetic fields, it will be appreciated by one skilled in the art that embodiments of the invention can also be used for electrical machines that use axial fields for rotor/stator interaction, with the inserts oriented in the radial direction.

Figure 1:
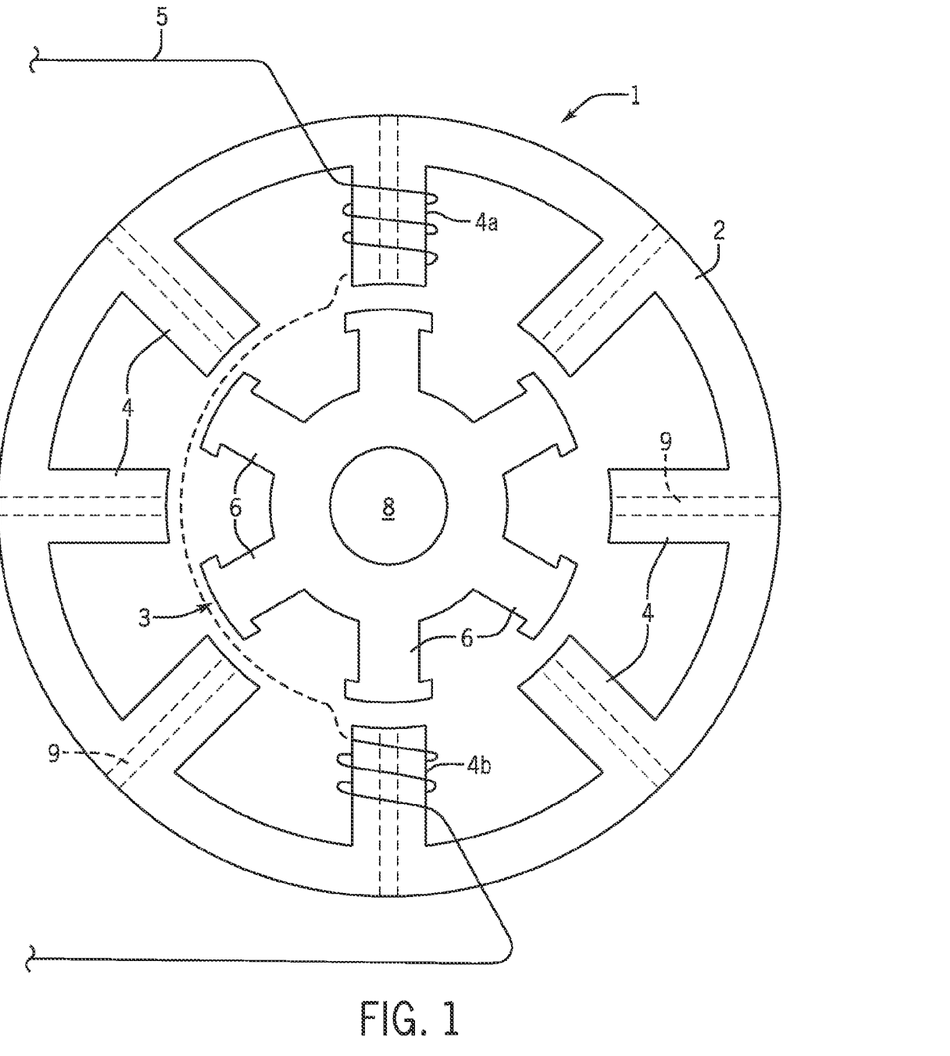
FIG. 1 is a schematic view of an electrical machine useable with embodiments of the invention.

Referring to FIG. 1, a typical electrical machine 1 that may benefit from embodiments of the present invention is shown. The electrical machine 1 includes a stator 2 (e.g., laminated iron stator) that surrounds a rotor 3 in the radial direction and extends axially along rotor 3. The stator 2 further includes a plurality of stator poles 4, with each stator pole 4 being matched with a radially opposite stator pole to form a stator pole pair. Stator pole pairs 4a and 4b are wound with a phase winding 5 that may be driven in a conventional manner from a remote source (not shown). Separate phase windings, (not shown), are also included on the other stator poles 4 in a like manner.

As shown in FIG. 1, the rotor 3 is formed as a salient rotor having a plurality of salient pole pieces 6. According to one embodiment, the rotor 3 is constructed of a stack of integral laminations 7, as can be seen in the view of the rotor 3 provided in FIG. 2, although it is recognized that the rotor core could also be formed as a single piece—with the core being machined out of steel or formed from sintered magnetic materials, for example. The rotor 3 includes multiple projections/teeth 6 acting as salient magnetic poles. A central portion of the rotor 3 includes a rotor bore 8 through which a drive shaft may be inserted, about which the rotor 3 can rotate.

The exact structure of the electrical machine may take one of numerous forms, according to embodiments of the invention. For example, the electrical machine may be configured as a reluctance motor that induces non-permanent magnetic poles, with the phase windings 5 of the stator 3 being driven in a predetermined sequence to cause rotor 3 to rotate. The reluctance motor may be a synchronous reluctance motor having equal numbers of stator and rotor poles or a switched reluctance motor where the number of stator pole pairs exceeds the number of rotor pole pairs by one. As another example, the electrical machine may be configured as a stator permanent magnet machine (e.g., permanent magnet flux switching machine, permanent magnet flux reversal machine, or doubly-salient permanent magnet machine, for example) that includes permanent magnets 9 (shown in phantom) embedded in the stator. In such stator permanent magnet machines, electric current in the windings 5, interacts with magnetic fields associated with the magnets 9 to cause rotation of the rotor 3.

Figure 2:
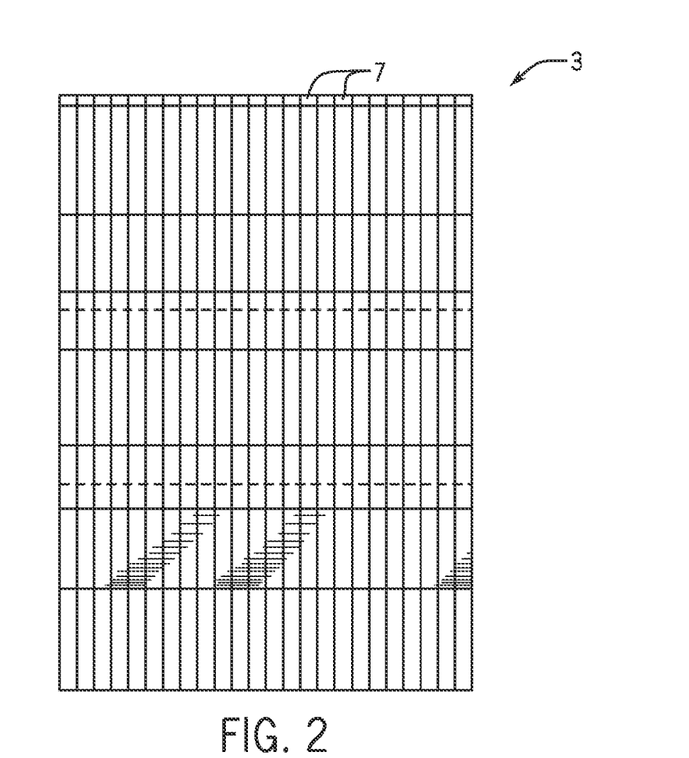
FIG. 2 is a side view of a rotor of an electrical machine useable with embodiments of the invention.

It is recognized that FIGS. 1 and 2 are meant to only illustrate examples of electrical machines that can benefit from incorporating embodiments of the invention. That is, embodiments of the invention can be implemented in a plurality of different types of electrical machines that require the use of salient poles or protruding teeth on the rotor. As such, embodiments of the invention are not meant to be limited only to the types of electrical machines shown and described herein.

Figure 3:
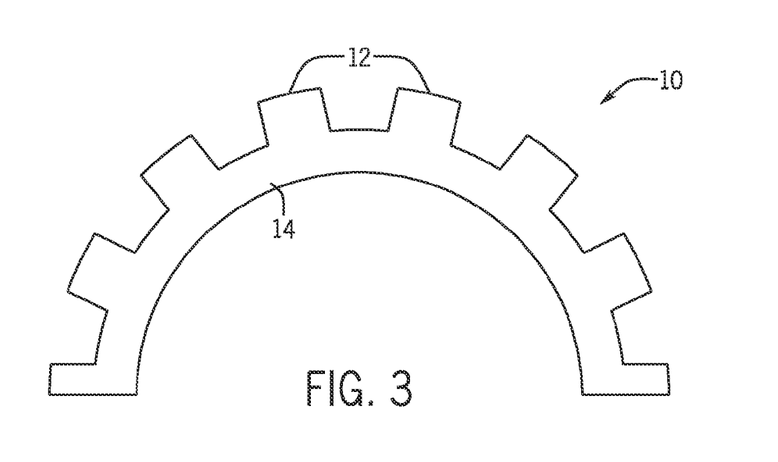
FIG. 3 is a schematic diagram of a toothed rotor useable with embodiments of the invention.
Figure 4:
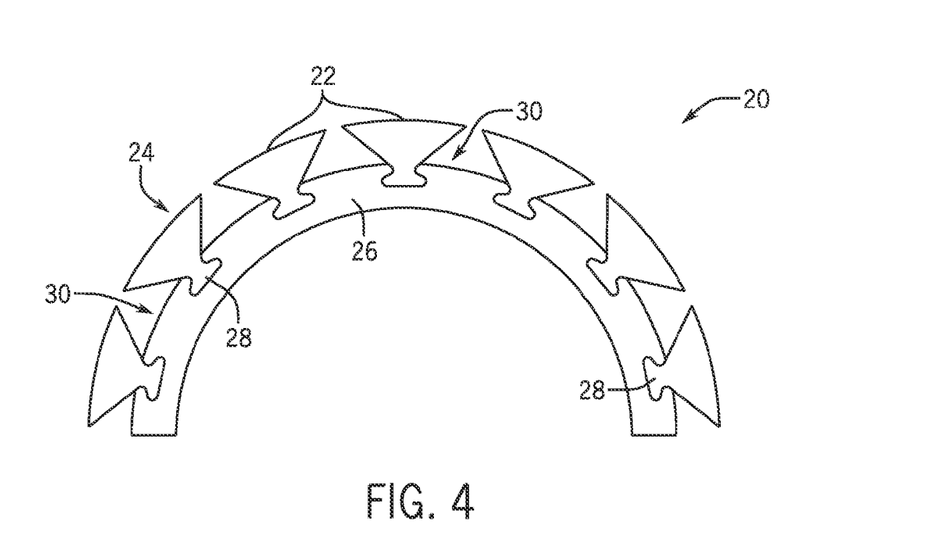
FIG. 4 is a schematic diagram of a segmented rotor useable with embodiments of the invention.

Referring now to FIGS. 3 and 4, embodiments of salient rotors with which embodiments of the invention can be incorporated are shown. Referring first to FIG. 3, a construction of a toothed rotor 10 is shown, where a plurality of rotor teeth or poles 12 extends radially outward from an inner hub 14 or portion of the rotor with which the teeth 12 are integrally formed. Referring to FIG. 4, a construction of a segmented rotor 20 is shown, where each salient rotor pole 22 is formed as a separate component from the other rotor poles. As shown in FIG. 4, the separate rotor poles are arranged circumferentially around a non-magnetic rotor hub 26, with each rotor pole 22 mating with the rotor hub 26 via a mating feature 28 formed on the bottom of the rotor pole (i.e., on each lamination of the rotor pole). A recess 30 between each rotor pole 22 of the segmented rotor 20 is configured to receive an insert therein to be held radially between the rotor poles 22 against centrifugal force caused by rotation of the rotor, as will be described in detail further below.

According to embodiments of the invention, salient rotors 10, 20 such as those shown in FIGS. 3 and 4 can be made mechanically smooth by providing electrically non-conductive and non-magnetic inserts that partially fill the interpolar spaces between the rotor poles and that, in conjunction with the rotor poles, form a mechanically "smooth" outer surface on the rotor—with it being understood that "smooth" as used herein does not necessarily require that the rotor assembly outer surface to be round or completely smooth, just that the inserts traverse a distance between adjacent rotor poles to present an essentially closed surface therebetween. Thus, for example, it is envisioned that the inserts could be constructed as having a linear outer face/segment rather than an arc segment bridging adjacent rotor poles (in order to provide a cheaper insert) and that this would still be considered to present a mechanically smooth outer surface on the rotor. The non-conductive and non-magnetic rotor insert pieces address the issue of windage losses associated with salient rotors without affecting the magnetic performance. The non-conductive and non-magnetic inserts are constructed and assembled with the salient rotor in a mechanically robust way that can withstand centrifugal forces at high speeds, while minimizing the mass that is added to the rotor. According to an exemplary embodiment, each of the inserts is formed as a solid integral piece that extends axially through the entire length of the salient rotor.

Figure 5:
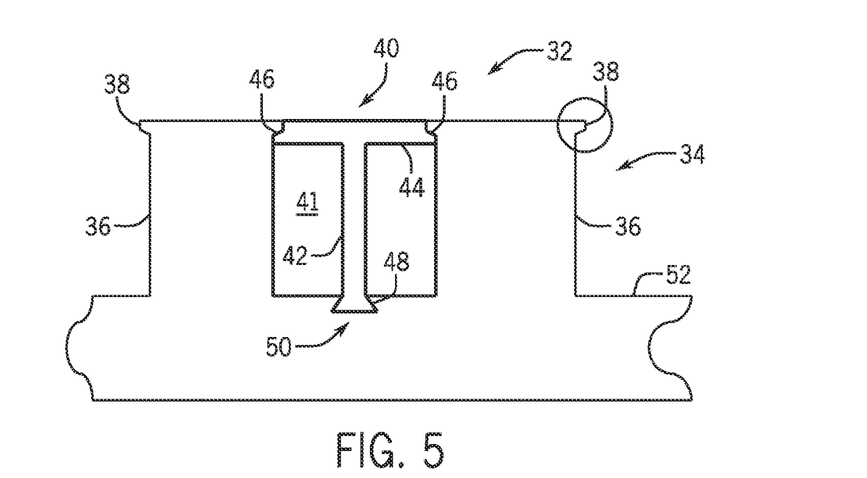
FIGS. 5, 6, and 7A-7C are schematic diagrams of a rotor assembly including a toothed rotor and electrically non-conductive, non-magnetic rotor inserts according to embodiments of the invention.
Figure 6:
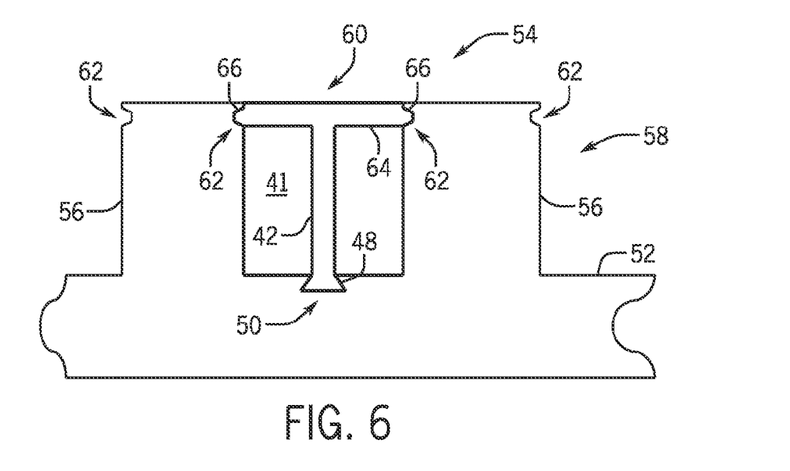
Figure 7A:
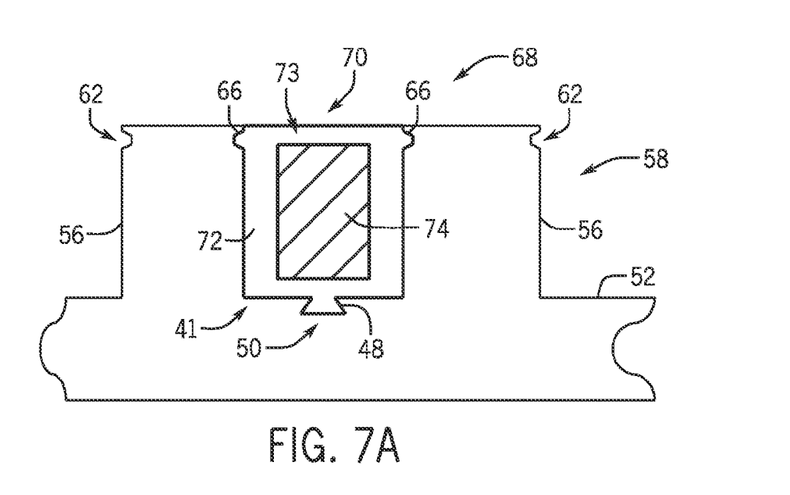
Figure 7B:
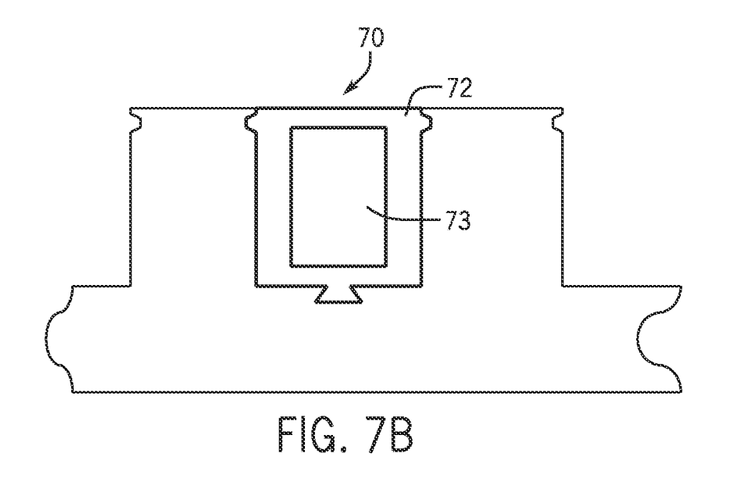
Figure 7C:
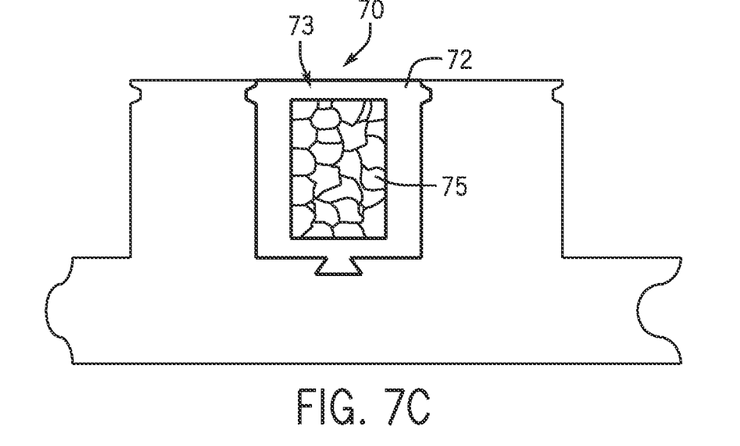

Referring now to FIGS. 5-7, portions of a rotor assembly according to various embodiments of the invention are shown. The rotor assembly of each embodiment includes a toothed rotor and a non-conductive, non-magnetic insert inserted in an interpolar space between each pair of adjacent rotor teeth in the toothed rotor. As can be seen, the rotor insert can have various shapes/cross-sections according to embodiments of the invention, with the shape of the inserts being adapted to the shape of the rotor poles of the particular salient rotor that is employed and the amount of centrifugal strength required to support the speed of the rotor.

As shown in FIG. 5, a rotor assembly 32 is provided having a toothed rotor 34 that includes rotor teeth 36 having a flange-like protrusion 38 at the radially outermost portion of each of rotor tooth 36, with the protrusion 38 extending normal to the tooth 36 on each side thereof. An electrically non-conductive, non-magnetic insert insert 40 is formed as a T-shaped insert positioned in an interpolar space 41 between adjacent teeth 36, with the T-shaped insert 40 having a lengthwise member 42 extending in the axial direction and a crosswise member 44 extending normally between two adjacent rotor teeth 36, with the crosswise member 44 forming a smooth outer surface on the toothed rotor 34 in combination with a pair of adjacent rotor teeth 36. The crosswise member 44 is formed to include a shoulder 46 on each end thereof that abuts a respective protrusion 38 on a rotor tooth, such that the protrusions 38 mate with the shoulders 46 on the T-shaped insert 40 to hold the insert in place against centrifugal forces experienced during rotor rotation. Also included on the T-shaped insert 40 is a mating feature 48 formed on an inner end of the lengthwise member 42. The mating feature 48 is configured to mate with an opening 50 formed in the back iron/inner hub 52 of the toothed rotor 34, such that the mating of the insert 40 to the toothed rotor 34 is further reinforced and the rotor assembly 32 is made more robust to centrifugal forces acting thereon. According to an exemplary embodiment, the mating feature 48 is configured as a dovetail feature that mates with a dovetail-shaped opening 50 to provide the increased robust to centrifugal forces; however, it is recognized that mating features of other shapes/configurations are also envisioned as being used.

FIG. 6 shows a rotor assembly 54 similar to that of FIG. 5 (with like elements numbered the same as in FIG. 5), but with the teeth 56 of a toothed rotor 58 and T-shaped inserts 60 having different features formed thereon. That is, the rotor teeth 56 are formed to each include axially-extending notches 62 formed therein in proximity to the radially outermost portion of each rotor tooth 56. The crosswise member 64 of the T-shaped insert 60 is formed to include a shoulder 66 on each end thereof that mates with the notches 62 of adjacent teeth 56 to hold the insert 60 in place against centrifugal force experienced during rotor rotation. Also included on the T-shaped insert 60 is a mating feature 48 formed on an inner end of the lengthwise member 42. The mating feature 48 is configured to mate with an opening 50 formed in the back iron/inner hub 52 of the toothed rotor 58, such that the mating of the insert 60 to the toothed rotor 58 is further reinforced and the rotor assembly 54 is made more robust to centrifugal forces acting thereon.

Referring now to FIG. 7A, a rotor assembly 68 is shown having a toothed rotor 58 identical to that of the toothed rotor in FIG. 6, with the toothed rotor 58 having rotor teeth 56 formed to each include axially-extending notches 62 formed therein in proximity to the radially outermost portion of each rotor tooth 56. The non-conductive, non-magnetic insert 70 of rotor assembly 68, however, differs from the insert 60 of rotor assembly 54 (FIG. 6)—in that the insert 70 is configured to fill an entire interpolar space or gap 41 between adjacent rotor teeth 56 rather than having a T-shape that leaves part of the gap 41 open. As the insert 70 is larger in size than the T-shaped inserts 40, 60 (FIGS. 5 and 6), it is recognized that the mass thereof may be greater than that of the T-shaped inserts—which may be undesirable with respect to the centrifugal forces generated by the insert during rotor rotation. In order to minimize the mass of the insert 70 to the extent possible, the non-conductive, non-magnetic insert is formed as what is referred to here as a "hollow" insert, in that it includes an interior region that is not formed of a material of higher density. The "hollow" insert includes an outer shell 72 formed of a non-conductive, non-magnetic material, with the outer shell 72 defining an area or opening 73. According to an exemplary embodiment, the outer shell 72 is formed of a non-conductive, non-magnetic material that provides a high mechanical strength and rigidity to the insert. According to one embodiment of the invention, the opening 73 includes an inner filler 74 formed of a non-conductive, non-magnetic material different from that used to form outer shell 72, such that the insert 70 is formed as a multi-material insert. The inner filler 74 is formed of non-conductive, non-magnetic material having a lower density than the outer shell material—and may be formed, for example, of a dielectric foam that is very light weight. The inclusion of inner filler 74 in the insert 70 in an interior of outer shell 72 functions to greatly reduce the overall weight of the insert 70, such that the centrifugal forces generated by the inserts 70 are greatly reduced—thereby improving the functioning and longevity of the rotor assembly 68. Additionally, inclusion of the inner filler 74 within the outer shell 72, prevents air churning and distortion during operation of the rotor assembly 68, thereby improving an efficiency thereof.

According to other embodiments, the area 73 defined by outer shell 72 may be left open (or partially open)—such that the mass of the insert 70 is reduced. That is, in one embodiment, the opening 73 may be left entirely unfilled, as shown in FIG. 7B. In another embodiment, and as shown in FIG. 7C, the hollow area 73 defined by outer shell 72 could include a weight reduced structure formed therein, such as a honeycomb structure 75 extruded with the shell 72 that provides rigidity to the insert 70 while still serving to reduce the overall mass of the insert. The interior of the honeycomb structure 75 could be left unfilled or could include a foam material therein.

As shown in FIG. 7, the outer shell 72 of the insert 70 includes retaining features thereon similar to those formed on T-shaped insert 60 (FIG. 6). That is, outer shell 72 includes a shoulder 66 on each end thereof that mates with the notches 62 of adjacent rotor teeth 56, as well as a mating feature 48 (e.g., a dovetail) formed on an axially inner surface thereof that mates with a corresponding opening 50 formed in the back iron/inner hub 52 of the toothed rotor 58. The shoulders 66 and mating feature 48 hold the insert 70 in place against centrifugal force experienced during rotor rotation and help form a rotor assembly 68 that is robust to centrifugal forces acting thereon.

Figure 8:
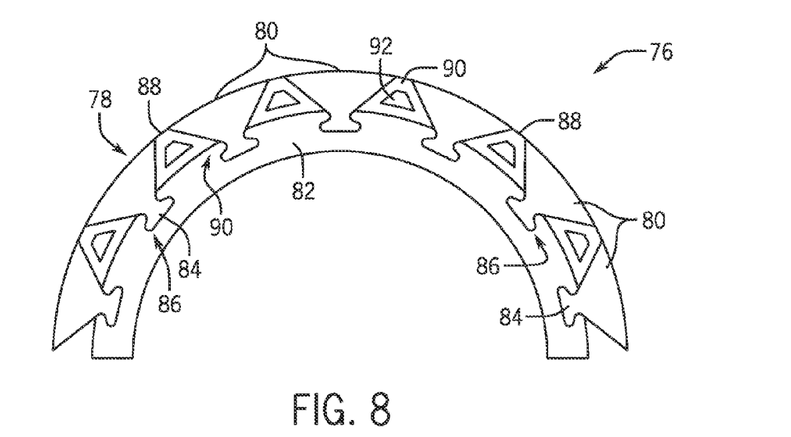
FIG. 8 is a schematic diagram of a rotor assembly including a segmented rotor and electrically non-conductive, non-magnetic rotor inserts according to an embodiment of the invention.

Referring now to FIG. 8, a portion of a rotor assembly 76 is shown according to another embodiment of the invention, with the rotor assembly 76 having a segmented rotor 78 formed of a plurality of separate rotor poles 80 that are mated circumferentially around a non-magnetic rotor hub 82 by way of a mating feature (e.g., dovetail feature) 84 on the rotor poles 80 that mates with an opening/receptacle 86 formed in the hub 82. The rotor assembly 76 also includes non-conductive, non-magnetic inserts 88 inserted between each pair of adjacent rotor poles 80—in an interpolar gap 90 formed by the adjacent rotor poles 80. As shown in FIG. 8, the non-conductive, non-magnetic inserts 88 are formed as inserts that are configured to be received in the interpolar gap 90 formed between each adjacent pair of rotor poles 80—with the inserts 88 having a shape that conforms to that of the gaps 90. According to an exemplary embodiment, the inserts have a dovetail construction that enables the inserts to be held radially between the rotor poles 80 against centrifugal force caused by rotor rotation.

According to an exemplary embodiment, the insert 88 is formed as a multi-material insert having an outer shell 90 formed of a first non-conductive, non-magnetic material and an inner filler 92 formed of a second non-conductive, non-magnetic material. According to an exemplary embodiment, the outer shell 90 is formed of a non-conductive, non-magnetic material that provides a high mechanical strength and rigidity to the insert. The inner filler 92 is formed of non-conductive, non-magnetic material having a lower density than the outer shell 90 material—and may be formed, for example, of a dielectric foam that is very light weight. The inclusion of inner filler 92 in the insert in an interior thereof functions to greatly reduce the overall weight of the insert 88, such that the centrifugal forces generated by the inserts 88 are greatly reduced—thereby improving the functioning and longevity of the rotor assembly 76. Alternatively, it is recognized that the insert 88 could also be formed as an extrusion with internal features that provide for increased strength, without the weight penalty of being solid, as discussed above.

Figure 9:
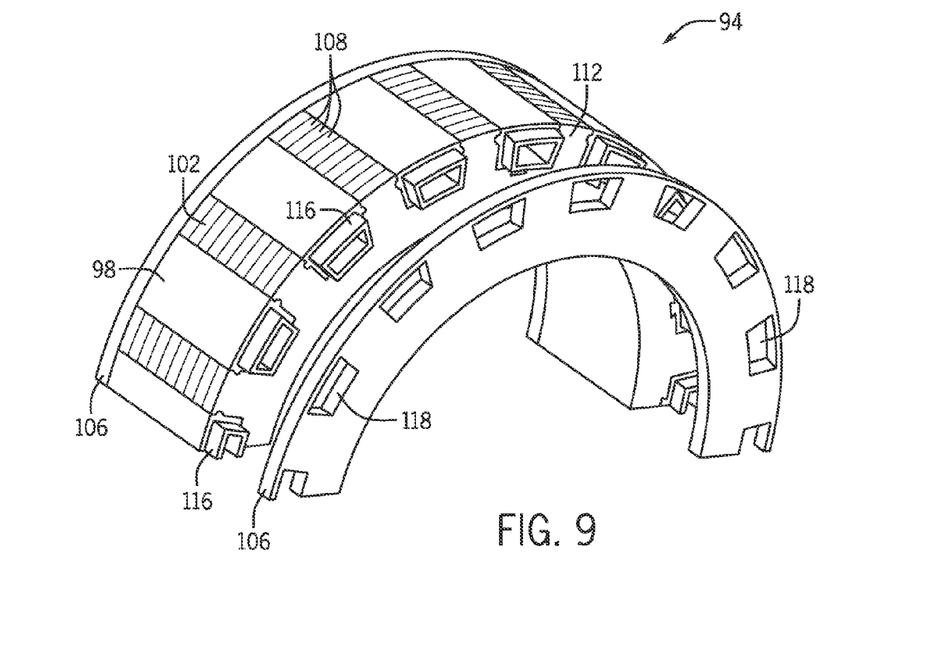
FIG. 9 is a schematic diagram of a rotor assembly including a toothed rotor, electrically non-conductive, non-magnetic rotor inserts, and electrically non-conductive, non-magnetic end plates according to an embodiment of the invention.
Figure 10:
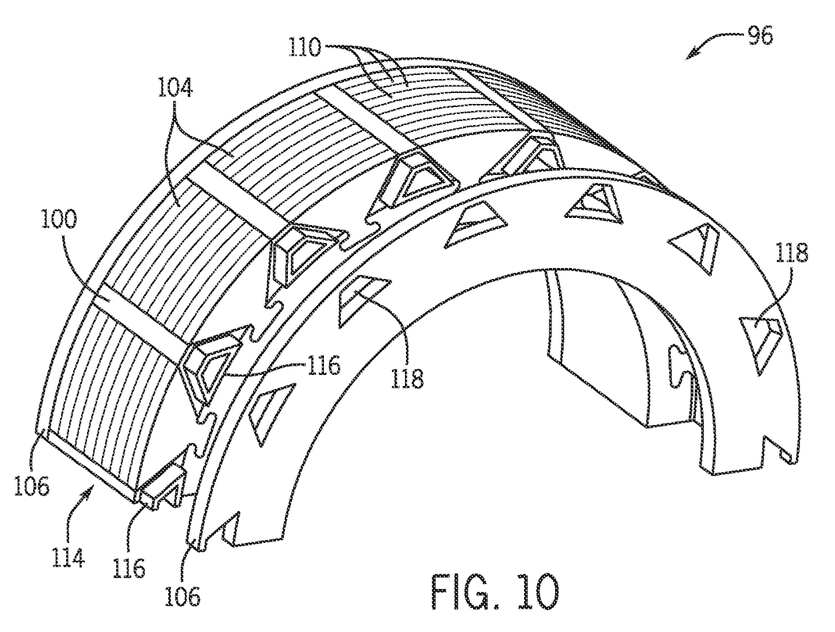
FIG. 10 is a schematic diagram of a rotor assembly including a segmented rotor, electrically non-conductive, non-magnetic rotor inserts, and electrically non-conductive, non-magnetic end plates according to an embodiment of the invention.

Referring now to FIGS. 9 and 10, rotor assemblies 94, 96 for a toothed rotor and a segmented rotor are shown, respectively, according to additional embodiments of the invention. In each of the rotor assemblies 94, 96, a "cage-like" assembly is provided for fastening of the rotor assembly 94, 96 and for providing additional retaining strength for the non-conductive, non-magnetic inserts 98, 100 positioned between the salient rotor poles 102, 104 of the rotors in order to make the assembly more robust. For forming the cage-like assembly, non-conductive, non-magnetic end plates 106 are positioned at opposing ends of the rotor assembly 94, 96—on opposite sides of a toothed rotor or segmented rotor 112, 114 that, according to one embodiment, may be formed of a stack(s) of rotor laminations 108, 110 (or that alternatively may be formed as a single piece). As shown in FIGS. 9 and 10, the non-conductive, non-magnetic inserts 98, 100 that extend axially through the entire length of the stack of rotor laminations 108, 110 include a mating feature 116 formed on each end thereof that is constructed to mate with a corresponding opening 118 formed in the end plates 206. The mating features 116 formed on the inserts 98, 100 are received in the openings 118 formed in the end plates 106 so as to mate the inserts to the end plates and thereby form the "cage-like" rotor assembly. The end plates 106 function to both provide fastening of the rotor assembly 94, 96 (i.e., fastening of the stack(s) of rotor laminations 108, 110 of the toothed rotor 112 or segmented rotor 114, if the rotors are formed of laminations) and to provide additional retaining strength for the inserts 98, 100, making the rotor assemblies 94, 96 more robust.

Beneficially, embodiments of the invention thus provide non-conductive, non-magnetic rotor inserts that provide smoothing for various types of salient rotors. The rotor inserts enable significant reduction of friction and windage losses, as the rotor surface becomes mechanically smooth based on the positioning of the inserts between adjacent pairs of rotor poles, so as to provide a significant efficiency improvement (i.e., better efficiency than a non-smooth rotor), especially for high-speed applications. The non-conductive, non-magnetic rotor inserts are assembled with the salient rotor in a mechanically robust way, such as via the use of mating (e.g., dovetail) features on the inserts, that enable the inserts to withstand centrifugal forces at high speeds. The non-conductive, non-magnetic rotor inserts are further constructed to minimize the mass that is added to the rotor, with the inserts being formed to fill only a portion of an interpolar between adjacent rotor poles and/or being formed partially of a low-density material.

Therefore, according to one embodiment of the invention, an electrical machine includes a stator and a rotor assembly disposed within the stator and configured to rotate relative to the stator, wherein the rotor assembly comprises a rotor core comprising a plurality of salient rotor poles that are spaced apart from one another around an inner hub such that an interpolar gap is formed between each adjacent pair of salient rotor poles, with an opening being defined by the rotor core in each interpolar gap, and a plurality of inserts positioned in the gaps formed between the plurality of salient rotor poles, the plurality of inserts being formed of electrically non-conductive and non-magnetic material. Each of the plurality of inserts comprises a mating feature formed an axially inner edge thereof that is configured to mate with a respective opening being defined by the rotor core, so as to secure the insert to the rotor core against centrifugal force experienced during rotation of the rotor assembly.

According to another embodiment of the invention, a method for manufacturing an electrical machine includes providing a stator and providing a rotor assembly that is positionable within the stator and is mountable for rotation about a central axis, wherein providing the rotor assembly comprises providing a salient rotor core comprising a plurality of salient rotor poles that are spaced apart from one another around an inner hub such that an interpolar gap is formed between each adjacent pair of salient rotor poles, with a dovetail-shaped opening being defined by the rotor core in each interpolar gap. Providing the rotor assembly further comprises providing a plurality of inserts formed of electrically non-conductive and non-magnetic material and securing the plurality of inserts in the interpolar gaps formed between the plurality of salient rotor poles, wherein, in securing each of the plurality of inserts in an interpolar gap formed between an adjacent pair of salient rotor poles, a mating feature of the insert is mated with a respective opening being defined by the rotor core, so as to secure the insert to the rotor core against centrifugal force experienced during rotation of the rotor assembly.

According to yet another embodiment of the invention, a rotor assembly for an electrical machine includes a salient rotor comprising a plurality of salient rotor poles that are spaced apart from one another around an inner hub such that an interpolar gap is formed between each adjacent pair of salient rotor poles and a plurality of inserts positioned in the interpolar gaps formed between the plurality of salient rotor poles and being constructed such that the plurality of inserts in combination with the plurality of salient rotor poles forms a smooth outer surface on the rotor assembly. The plurality of inserts comprise one of T-shaped inserts formed of an electrically non-conductive and non-magnetic material, hollow inserts having an outer shell formed of an electrically non-conductive and non-magnetic material, or dovetail-shaped inserts formed of an electrically non-conductive and non-magnetic material. Each of the plurality of inserts is configured to mate with the salient rotor so as to secure the insert to the salient rotor against centrifugal force experienced during rotation of the rotor assembly.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An electrical machine comprising:
  a stator;
  a rotor assembly disposed within the stator and configured to rotate relative to the stator, wherein the rotor assembly comprises:
    a rotor core comprising a plurality of salient rotor poles that are spaced apart from one another around an inner hub such that an interpolar gap is formed between each adjacent pair of salient rotor poles, with an opening being defined by the rotor core in each interpolar gap; and
    a plurality of inserts positioned in the gaps formed between the plurality of salient rotor poles, wherein each of the plurality of inserts comprises:
      an outer shell formed of a first electrically nonconductive and non-magnetic material, the outer shell defining a hollow area there within; and
      an inner filler material positioned in the hollow area defined by the outer shell, the inner filler material being formed of a second nonconductive and non-magnetic material having a lower density than the first electrically nonconductive and non-magnetic material.

2. The electrical machine of claim 1, wherein the rotor core comprises a toothed rotor.

3. The electrical machine of claim 2, wherein the plurality of salient rotor poles comprises a plurality of rotor teeth that are integrally formed with the inner hub.

4. The electrical machine of claim 2 wherein the mating feature is formed on the outer shell.

5. The electrical machine of claim 2, wherein the mating feature secures the insert to the rotor core against centrifugal force experienced during rotation of the rotor assembly.

6. The electrical machine of claim 2, wherein the mating feature comprises a dovetail feature configured to mate with an opening formed in the inner hub of the rotor core.

7. The electrical machine of claim 1, wherein each of the plurality of inserts comprises a mating feature forming a radially inner edge thereof that is configured to mate with a respective opening being defined by the rotor core.

8. The electrical machine of claim 1 further comprising a honeycomb structure formed in the hollow area, the honeycomb structure being formed integrally with the outer shell.

9. The electrical machine of claim 1, wherein each of the plurality of salient rotor poles comprises a pair of flange-like protrusions formed at a radially outermost portion thereof, and each outer shell comprises a shoulder configured to mate with the pair of flange-like protrusions formed on the salient rotor poles.

10. The electrical machine of claim 1, wherein each of the plurality of salient rotor pole comprises a pair of axially-extending notches formed in proximity to a radially outermost portion thereof, and each outer shell comprises a shoulder configured to mate with the pair of axially-extending notches formed on the salient rotor poles.

11. The electrical machine of claim 1, wherein the rotor core comprises a segmented rotor where each of the salient rotor poles comprises a separate component from the other salient rotor poles, and wherein the plurality of separate salient rotor poles are arranged circumferentially around a non-magnetic inner hub and mated with the non-magnetic inner hub.

12. The electrical machine of claim 11, wherein each adjacent pair of separate salient rotor poles on the segmented rotor forms an interpolar gap, and wherein each of the plurality of inserts has a shape corresponding to the interpolar gap so as to mate with a respective interpolar gap formed between an adjacent pair of salient rotor poles.

13. A method for manufacturing an electrical machine, the method comprising:
  providing a stator;
  providing a rotor assembly that is disposed within the stator and is mountable for rotation about a central axis, wherein providing the rotor assembly comprises:
  providing a rotor core comprising a plurality of salient rotor poles that are spaced apart from one another around an inner hub such that an interpolar gap is formed between each adjacent pair of salient rotor poles, with an opening being defined by the rotor core in each interpolar gap;
  providing a plurality of inserts positioned within the gaps formed between the plurality of salient rotor poles, wherein each of the plurality of inserts comprises:
    an outer shell formed of a first electrically nonconductive and non-magnetic material, the outer shell defining a hollow area there within; and
    an inner filler material positioned in the hollow area defined by the outer shell, the inner filler material being formed of a second nonconductive and non-magnetic material having a lower density than the first electrically nonconductive and non-magnetic material; and
  securing the plurality of inserts in the interpolar gaps formed between the plurality of salient rotor poles.

14. The method of claim 13 wherein providing a salient rotor core comprises providing a toothed rotor.

15. The method of claim 14, wherein the plurality of salient rotor poles comprises a plurality of rotor teeth that are integrally formed with the inner hub.

16. The method of claim 13, wherein each of the plurality of inserts comprises a mating feature forming a radially inner edge thereof that is configured to mate with a respective opening being defined by the rotor core.

17. The method of claim 13 further comprising forming a honeycomb structure in the hollow area integrally with the outer shell.

18. A reluctance motor comprising:
  a stator;
  a rotor assembly disposed within the stator and configured to rotate relative to the stator, wherein the rotor assembly comprises:
    a rotor core comprising a plurality of salient rotor poles that are spaced apart from one another around an inner hub such that an interpolar gap is formed between each adjacent pair of salient rotor poles, with an opening being defined by the rotor core in each interpolar gap; and a plurality of inserts positioned in the gaps formed between the plurality of salient rotor poles, wherein each of the plurality of inserts comprises:
an outer shell formed of a first electrically nonconductive and non-magnetic material, the outer shell defining a hollow area there within; and
an inner filler material positioned in the hollow area defined by the outer shell, the inner filler material being formed of a second nonconductive and non-magnetic material having a lower density than the first electrically nonconductive and non-magnetic material.

19. The motor of claim 18, wherein each of the plurality of inserts comprises a mating feature forming a radially inner edge thereof that is configured to mate with a respective opening being defined by the rotor core.

20. The motor of claim 18, further comprising a honeycomb structure formed in the hollow area, the honeycomb structure being formed integrally with the outer shell.

* * * * *